Nov. 20, 1962

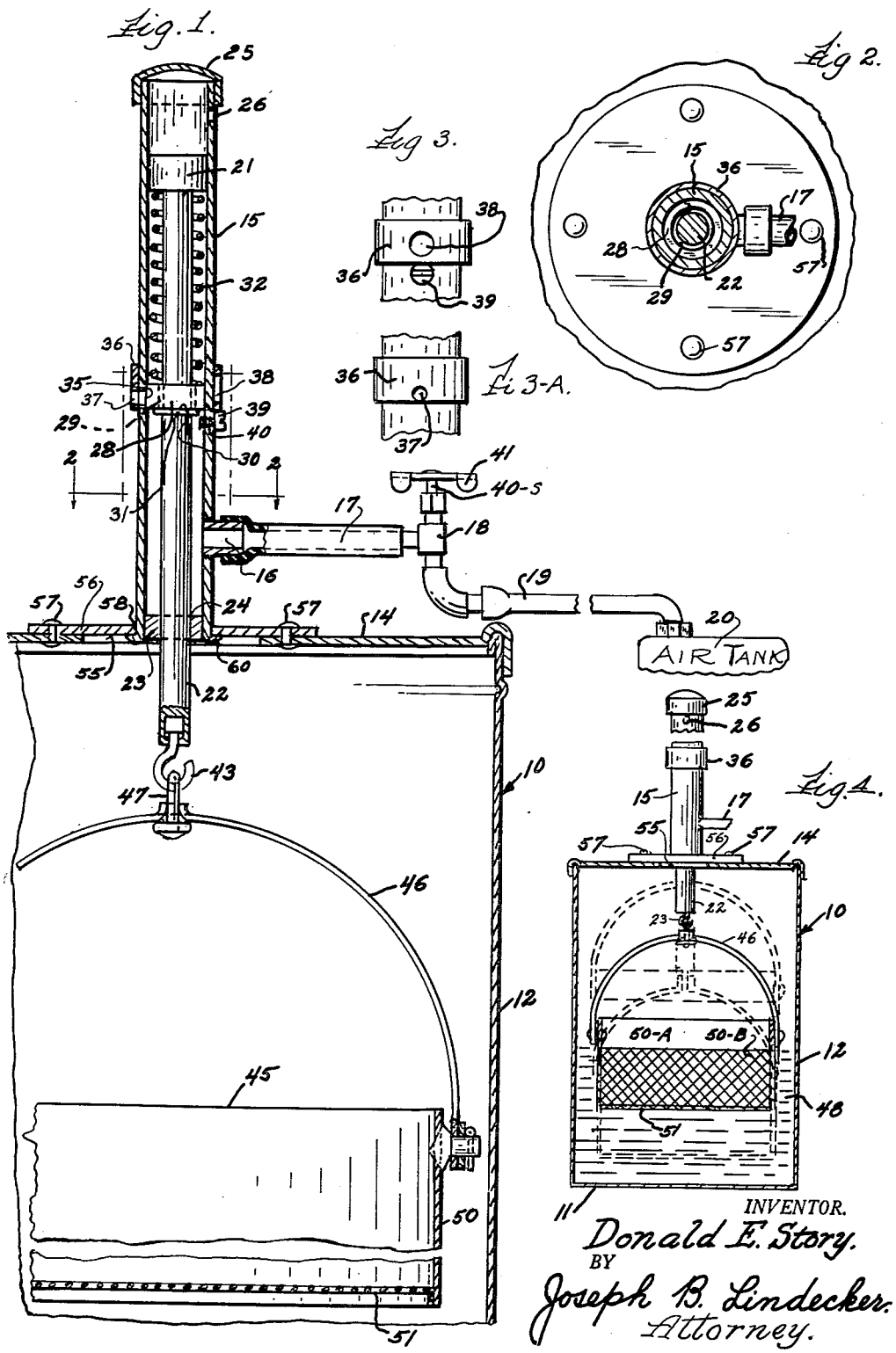

D. E. STORY 3,064,629

PORTABLE VERTICAL RECIPROCATING WASHER OPERATED
BY COMPRESSED AIR FOR CLEANING MECHANICAL PARTS

Filed March 16, 1961

SOLVENT CONTAINER.

STRONG SOLUTION.    MEDIUM SOLUTION.    WEAK SOLUTION.    RINSE.

INVENTOR.
Donald E. Story.
BY
Joseph B. Lindecker,
Attorney.

United States Patent Office 3,064,629
Patented Nov. 20, 1962

3,064,629
PORTABLE VERTICAL RECIPROCATING WASHER OPERATED BY COMPRESSED AIR FOR CLEANING MECHANICAL PARTS
Donald E. Story, 602 Donaldson, Canton, Mo.
Filed Mar. 16, 1961, Ser. No. 96,140
5 Claims. (Cl. 121—101)

This invention relates to apparatus for cleaning foreign matter from metal parts and its principal object is to provide a washer in which greasy, oily and dirty parts or articles may be automatically washed or cleaned.

In many types of shops, and particularly garages and maintenance locations, it is necessary quite frequently to wash small parts for the purpose of removing foreign matter such as dirt, grease and oil. The present invention relates to a simple and economical device which can be provided conveniently for the mechanic or machinist so that the parts to be cleaned can be tossed into the washer as they are disassembled and will be cleaned and ready for reassembly in a short period of time.

It is one of the objects of the invention to provide a washing apparatus wherein the parts are supported in a screen basket which can be reciprocated vertically within a bath of suitable cleaning liquid, or solvent.

Another object of the invention is to provide a parts cleaning device wherein the parts and the basket containing the parts can be readily inserted for cleaning in cleaning liquid in a suitable container and removed therefrom without the operator reaching into the cleaning liquid or solvent.

Still another object of the invention is to provide a parts cleaning device wherein the parts are inserted in a basket, the basket connected with the power mechanism carried by the cover of the container, the basket and parts lowered into the cleaning liquid within the container, and then the basket raised and lowered through the cleaning liquid, or solvent by the power mechanism.

Still another object of the invention is to provide a parts washer wherein a container is used to hold a supply of a suitable cleaning solution or solvent in liquid form; the container can be an oil drum fitted with a removable cover, or other suitable container such as a thirty-five (35) pound grease bucket having a removable cover, a power mechanism being assembled to the upper surface of the removable cover with the lower end of its piston rod extending downwardly through the removable cover and having a hook secured thereto, a basket removably carried upon the depending hook, and whereby the power may be derived from a source of compressed air for raising and lowering the basket in the cleaning solution.

A still further object of the invention is to provide an improved device in which the removable cover of the container carries a power mechanism for reciprocating a parts carrying basket and in which the operating load is more nearly balanced during the operation of the apparatus whereby uniform conditions of wear are insured.

A still further object of the invention is to provide a parts basket with a carrying bail, the basket embodying solid cylindrical side walls and a screened bottom wall, or a solid cylindrical upper wall portion and a lower cylindrical screened wall portion with a screened bottom wall, the diameter of the basket being as large in diameter as possible so it can reciprocate within the container holding the cleaning liquid, whereby the solid side walls or solid upper side walls in the basket will force the cleaning liquid to flow upwardly and downwardly through the screened bottom wall and in and around the uncleaned parts during reciprocation of the basket, thereby cleaning the parts.

And still a further object of the invention is to provide a power-operated parts cleaning device wherein the power unit for operating the device is attached to a bucket cover and where power to operate said power unit is derived from air under pressure.

Other and further objects of the invention will be readily apparent when the following description is considered in connection with the accompanying drawings wherein:

FIGURE 1 is a vertical sectional view, parts broken away, of the cleaning device embodying the invention assembled on a bucket;

FIGURE 2 is a fragmentary sectional view taken on line 2—2 of FIG. 1;

FIGURE 3 is a fragmentary elevational view of the power unit showing the air flow regulating band with a finger hole therein;

Figure 5:
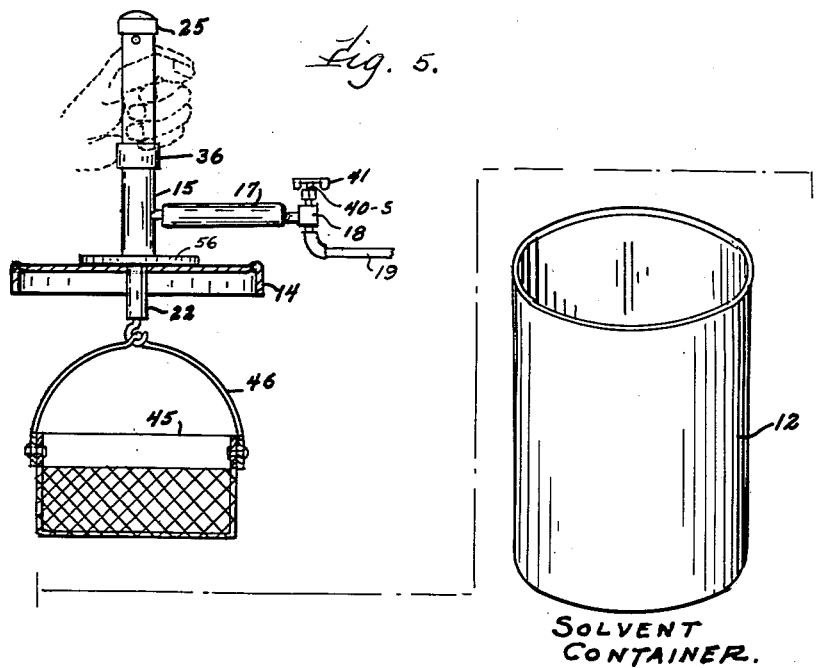
Figure 6:
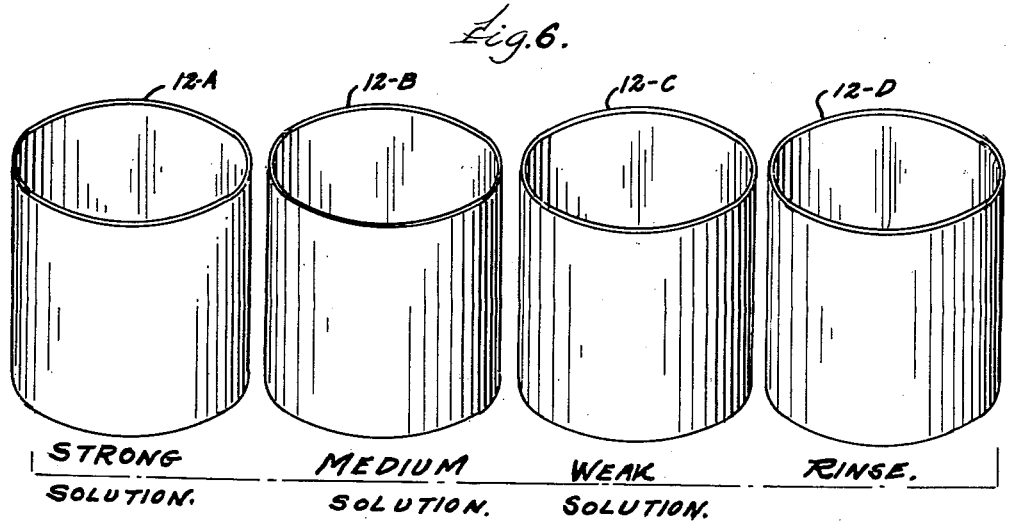

FIGURE 3-A is a view similar to FIG. 3, showing the air exhaust port in the regulating band;

FIGURE 4 is a fragmentary vertical sectional view similar to FIG. 1, showing the pulsating positions between full line position and dotted line position;

FIGURE 5 is a vertical sectional view of the power unit attached to the cover of a bucket and supporting a bucket, ready to be arranged in a bucket with a liquid solution, and FIGURE 6 is a diagrammatic view showing a plurality of containers for holding different solutions to which the basket is lowered, for progressive steps in the cleaning of the parts.

Referring to the drawings in detail, there is shown by FIGURES 1 and 4 a tank 10 which may be a former grease bucket for holding a supply of a suitable cleaning solution or liquid solvent. The tank 10 may be of suitable size which embodies the base 11 and the side wall 12, as seen by FIG. 4, and adapted to receive a removable cover 14, clearly shown by FIGURES 1 and 4. As shown by FIG. 1, the washing apparatus includes a vertically extending cylinder 15 having an inlet port 16 adjacent its lower end and which is connected by a rubber tubing 17 with a line valve 18 arranged in a line 19 connected to a source of compressed air confined in air tank 20.

A piston 21 which is vertically reciprocable in the cylinder 15 is rigidly connected at the upper end of a piston rod 22 which extends downwardly through the cylinder 15 to a point below the cover 14 and is centered in the cylinder by a guide ring 23 rigidly secured at the lowermost end of the cylinder 15. The guide ring 23, or bushing, has a central bore 24 substantially of the same diameter as that of the diameter of the piston rod 22, referred to as a close sliding fit without allowing air to escape therethrough. The diameter of said piston 21 is of substantially the same diameter as that of the inside diameter of said cylinder to provide a close sliding fit without allowing air to escape thereby. The upper end of said cylinder 15 is provided with a closure cap 25 to form a substantially closed cylinder 15. An air port 26 is provided in the side wall of the cylinder adjacent the closure cap to allow air to enter or be expelled to prevent the upper portion of the cylinder from becoming air bound.

An air valve 28 generally a disc made of brass ⅜ inch thick, fits inside of the cylinder 15 and has a central bore 29 approximately ⅝ inch in diameter to allow the ½ inch piston rod to extend loosely therethrough Intermediate the ends of said piston rod 22 is provided with a circular groove 30 into which is assembled a clip 31. The air valve 28 is assembled above said clip 31 and is held in resilient contact therewith by a coiled spring 32 sleeved upon the piston rod 22 between said piston 21 and said valve 28.

An air outlet port 35 is provided in the wall of said cylinder 15 approximately midway between the ends thereof. It will be seen by FIG. 1, the upper or outlet air port 35 is smaller than the lower or inlet port 16. The upper port 35 is preferably one-half the size in area as the lower port 16. A circular air port control band 36 of a width approximately three times the diameter of said upper port 35 is assembled upon said cylinder 15, said band 36 having a valve port 37 located adjacent the lower edge thereof, as clearly shown by FIG. 3-A. Said band has a finger grip opening 38 in the diametrically opposite side thereof from port 37. By inserting the finger tip of the operator's hand in said opening 38, said band 36 can be rotated upon said cylinder 15 to adjust the size of the air escaping opening; in other words, said band 36 forms a control valve for exhaust port 35. It is seen that the smaller opening effects decrease in the number of pulsations and increase of length of stroke of the piston. A set screw 39 is threaded through a threaded bore 40 in the cylinder 15 at a location intermediate its ends whereby the head of the screw prevents the band 36 from moving downwardly from assembled location and the threaded end of the screw 39 extends inside the cylinder 15 to a distance which will prevent the air valve 28 from passing to a lower location out of registry of the upper air port 35. The air valve 28 is free to travel upwardly with the upward movement of said piston rod but can never travel below registration of said upper air port 35, said coil spring 32 resiliently holding said valve 28 to a lowermost location.

Valve 18 is provided with a needle valve stem 40-S with a thumb screw type head 41 thereon, and valve 18 serves an important auxiliary function in that it enables the air from the air tank to escape at a predetermined rate regardless of quantity of air in the tank. By increasing the size of the opening by valve stem 40-S, it will increase the pressure on the piston and the number of pulsations thereof.

A hook 43 is secured in the lower end of said piston rod 22. A basket 45 having a bail 46 and ring 47 is removably arranged upon said hook 43 so it can be suspended in a washing medium 48 in tank 12, clearly shown by FIGURES 1 and 4. The basket 45 is preferably formed of a solid metal side wall 50 and a screen bottom wall 51. However, the basket may be formed with an upper side wall 50-A, a screened lower side wall 50-B and a second bottom wall 51, as shown by FIGURES 4 and 5. The diameter of basket 45 is maintained as large as possible to reciprocate vertically within said container 12 and force the washing medium 48 to flow upwardly and downwardly through the screened bottom wall 51 during reciprocation thereof in said container 12.

The cover 14 of the bucket 12 is provided with an opening 55 in the center thereof. A circular flange 56 is riveted over said opening 55 by rivets 57 spaced circumferentially therearound. Said flange 56 is provided with a central bore 58 through which the lowermost end 60 of said cylinder 15 is welded thereto so that when the cover 14 of the bucket 12 is arranged horizontally thereupon, the circular flange 56 is in a horizontal plane and said cylinder is in a vertical plane thereabove.

Upon opening of the line valve 18 the compressed air from tank 20 is forced through lower port 16 into cylinder 15 and upwardly through said central bore 29 in air valve 28 and into contact with the lower wall of said piston 21 elevating said piston rod 22 and basket 45. As soon as the clip 31 on piston rod 22 raises the air valve 28 above the location of upper air port 35, the space in the lower half of the cylinder is vented to the atmosphere. However, the momentum of the piston and its load in the basket tends to carry the piston into the uppermost portion of said cylinder 15 and said air valve 28 upwardly beyond port 35. After it has come to rest and moved downwardly, port 35 is again closed by valve 28 and the cycle repeated, the piston pulsating rapidly between some such positions as those represented by the full line position and dotted line position of the bail 46 of the basket 45, indicated in FIG. 4, thereby subjecting the contents of the basket to an effective washing action. Due to the fact that the piston is operated by compressed air, the descending piston, plus the basket load, operates actually to compress the air trapped in the lower portion of said cylinder 15; that is, after air valve 28 has closed port 35. This gives a shock-absorber action and a quiet operation of the working parts, the trapped air creating free potential energy assisting the following upstroke of the piston. Under operating conditions, the piston will be reciprocated vertically in the cylinder 15 with great rapidity so as to impart the desired agitating movement to other parts of the washing apparatus. The weight of the parts to be cleaned will hold the cover upon the bucket; the parts being in the basket with a screened bottom wall will be washed by the cleaning medium passing vertically thereby, the rapid reciprocation of the piston and basket effecting sufficient agitation to insure the cleaning of all of the parts. Several buckets of the same size may be used with the power unit. After cleaning of parts in the cleaning medium, it will be advisable to rinse the parts in buckets 12-A, 12-B, 12-C and 12-D as shown by FIG. 6, each bucket having a different strength solution therein as indicated.

The principal object is to effect reciprocation of the piston and basket carried thereby. In actual operation, the cover will be removed from the bucket. Cleaning medium or liquid solvent is placed in the bucket. The mechanic may toss the parts into the basket, then place the basket within the bucket with the cover closing the bucket, and turn on the compressed air, allowing the pump to function for several minutes.

When the cleaning operation is completed, the operator closes the line air valve and grasps the cylinder, raises the cover and basket from the bucket containing the cleaning medium. Before retrieving the parts from the basket, the entire unit can be placed upon a similar bucket containing a strong solution to remove the cleaning medium remaining on the parts. Reciprocation can be effected in this second bucket if so desired by opening the line air valve. This action can be repeated by inserting the unit upon various buckets with weaker solutions and finally in a rinse solution, such as hot water. It will be understood, of course, that variation of the size of the upper outlet air port 35, and by actuation of line valve 18, determined in relation to the total weight and friction load of the piston and its associated parts, it will be feasible to achieve speeds anywhere from a few strokes per minute up to a large number of strokes per minute.

It will be apparent from this, that the entire cleaning apparatus can be readily removed as a unit from a given size bucket, or tank, and can be readily transported by the operator and placed on a different tank as desired. In addition, the cleaning apparatus can be readily used in any size garage, or shop, with existing tanks, or grease buckets, and that it is not necessary to install special cleaning tanks, which are costly. Most all garages, and shops, have a source of air supply; one or more air lines are always available to provide the source of power required to operate this air pump.

It will be understood that various modifications and changes may be made in the particular embodiments of the invention which have been described and illustrated herein without departing from the scope of the claims attached hereto.

I claim:

1. A pneumatic motor comprising a vertical disposed cylinder, a closure on the upper end of said cylinder, a guide bushing with a central bore secured with the lower end of said cylinder, a piston rod assembled within said cylinder, a piston rigidly secured to the upper end portion of said piston rod, the lower end of said piston rod extending through said guide bushing and depending therefrom, releasable means secured to the lower end of said piston rod, said cylinder having an air inlet port adjacent its lower end and above said bushing adapted to be connected with a suitable compressed air source and an upper port intermediate the ends thereof opening to the atmosphere, means for adjusting the size of said upper port, an air valve resiliently carried by said piston rod intermediate its ends for closing and opening said upper port thereby effecting said piston to continue to reciprocate under the influence of the compressed air admitted to said inlet port and a clip means secured in an annular groove in said piston rod for limiting the distance of downward travel of said air valve on said piston rod.

2. A pneumatic motor according to claim 1 wherein said means for adjusting the size of said upper port consists of a movable ring type vertical band with an aperture extending transversely through one side of said band whereby said aperture can be moved into and out of registry with said upper port.

3. A pneumatic motor according to claim 1 wherein said releasable means secured on the lower end of said piston rod consists of a hook secured into the lower end of said rod.

4. A metal cleaning device air operated motor of the kind described, a cylinder provided with an inlet air port adjacent the lower end thereof and an air exhaust port substantially midway between its upper and lower ends, a piston therein secured to the upper end of a piston rod, and means sleeved upon said piston rod for automatically controlling the operation of said air motor, comprising a circular disk type air valve with a central vertical bore extending therethrough, said bore being larger in diameter than the diameter of said piston rod passing therethrough providing an annular air passage therethrough, stop means consisting of a U-shaped clip removably secured in an annular groove in said piston rod effecting raising and lowering of said air valve with the reciprocation of said piston rod, a coil spring sleeved upon said piston rod between said piston and said valve for resiliently maintaining said valve in contact with said stop means on said piston rod, manual operable ring type band with an aperture in its wall for registration with said exhaust port to control the size of the air passageway therethrough, means to prevent said air valve from moving below a horizontal plane in alignment with said exhaust port, a bushing secured within and adjacent the lower end of said cylinder, said bushing having a central vertical bore of substantially the same diameter as that of said piston rod for sealably enclosing the lower end of said cylinder surrounding said piston rod passing therethrough, and a hook removably secured to the lower end of said piston rod, whereby the automatic opening and closing of said exhaust port effects said piston to continue to reciprocate under the influence of the compressed air admitted to said inlet port.

5. In an air operated motor of the class described, a metal cylinder vertically and operatively mounted for use and having an air inlet port adjacent the lower end thereof and an air exhaust port substantially midway between its upper and lower ends, a bushing having a central bore therein secured in the lower end of said cylinder, a metal cap removably mounted upon the upper end of said cylinder, a piston rod extending through said bore in said bushing with its upper end extending into said cylinder, said bore in said bushing being substantially of the same diameter as the diameter of said piston rod providing a sliding fit, a piston rigidly secured upon the upper end of said piston rod, a hook means secured to the lower end of said piston rod where an object can be attached, a cylindrical air-valve having a central bore therein and sleeved upon said piston rod inside said cylinder, said bore in said air-valve being greater in diameter than the diameter of said piston rod thereby providing an air passage of annular configuration whereby air entering said inlet port will contact the bottom of said piston after passing through said air passage, a clip removably mounted in an annular groove in said piston rod thereby arresting the downward movement of said air-valve upon said piston rod when said piston rod is lowered below a definite location for holding said valve in position to close said air-exhaust port at a specific time, a coil spring sleeved upon said piston rod between said piston and said air-valve resiliently maintaining said air valve in contact with said clip, whereby the automatic opening and closing of said exhaust port effects said piston to continue to reciprocate under the influence of compressed air admitted through said air inlet port and into contact with the bottom of said piston.

References Cited in the file of this patent
UNITED STATES PATENTS

| | | |
|---|---|---|
| 867,968 | Gilbert | Oct. 15, 1907 |
| 1,117,679 | Lewis | Nov. 17, 1914 |
| 1,872,934 | Goldsborough | Aug. 23, 1932 |
| 1,896,994 | Armstrong | Feb. 7, 1933 |
| 2,277,508 | Bingham | Mar. 24, 1942 |
| 2,857,923 | Zinty | Oct. 28, 1958 |
| 2,995,178 | Rowan | Nov. 8, 1960 |